S. STORM.
HOSE COUPLING.
APPLICATION FILED JUNE 21, 1912.
1,078,112.
Patented Nov. 11, 1913.
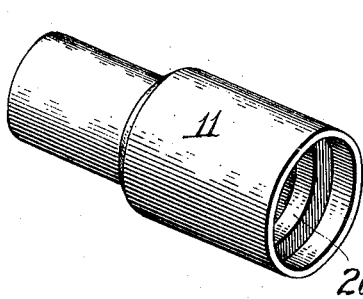
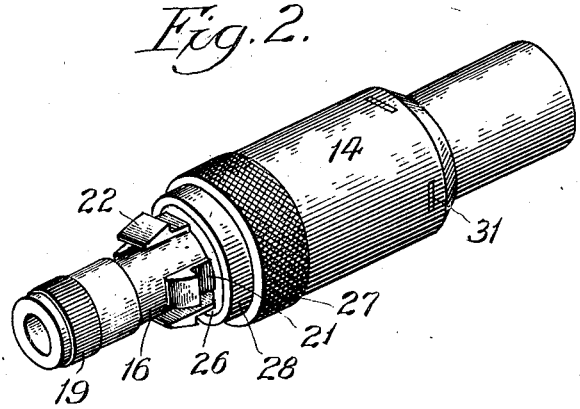
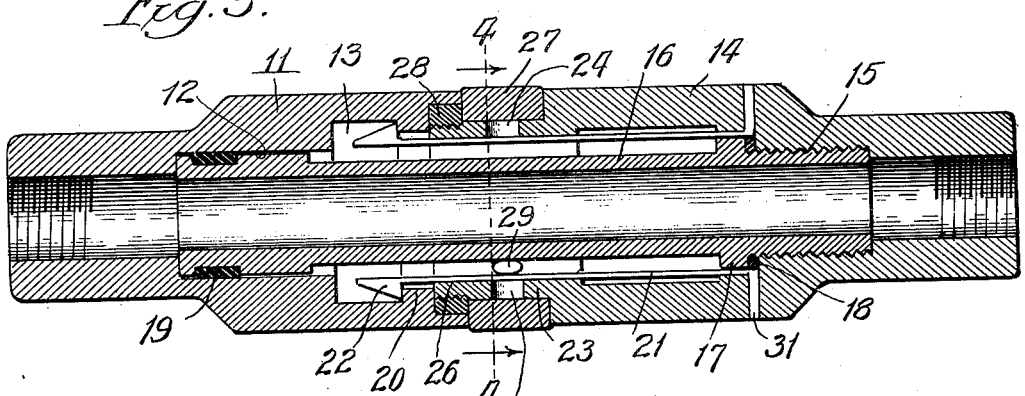
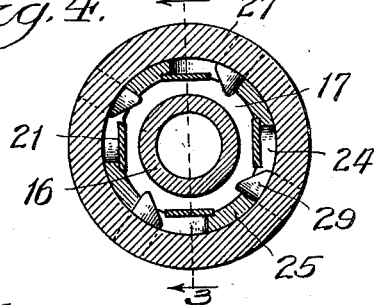
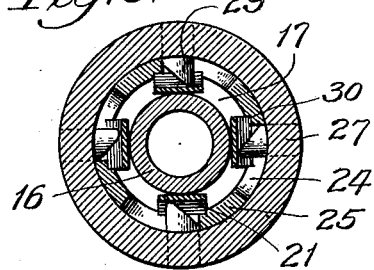
Inventor:
Samuel Storm,

UNITED STATES PATENT OFFICE.

SAMUEL STORM, OF MATTOON, ILLINOIS.

HOSE-COUPLING.

1,078,112.  Specification of Letters Patent. Patented Nov. 11, 1913.

Application filed June 21, 1912. Serial No. 705,065.

*To all whom it may concern:*

Be it known that I, SAMUEL STORM, a citizen of the United States, residing at Mattoon, in the county of Coles and State of Illinois, have invented certain new and useful Improvements in Hose-Couplers, of which the following is a specification.

The principal object of my invention is to provide a new and improved hose coupling.

Another object of my invention is to provide a hose coupling whose parts can be assembled by merely thrusting them directly together.

Another object of my invention is to provide means for locking the members of such a hose coupling together and means for unlocking them when it is desired to take the coupling apart.

These and other objects of my invention will be made apparent in the following specification and claims taken in connection with the accompanying drawings.

In these drawings I have illustrated one specific embodiment of my invention which I now proceed to describe.

It will be understood that the invention is defined in the appended claims.

Referring to the drawings—Figure 1 is a perspective view of one member of my improved coupling. Fig. 2 is a similar view of the other member. Fig. 3 is a longitudinal axial section of the hose coupling in assembled condition, this section being taken on the line 3—3 of Fig. 4 looking in the direction of the arrows. Fig. 4 is a transverse section taken on the line 4, 4 of Fig. 3, looking in the direction of the arrows. Fig. 5 is a section taken on the same line as that of Fig. 3, but with the parts shown in a different relation so as to unlock the hose coupling.

The two members to be coupled together are designated 11 and 14. The member 11 has an inside cylindrical seat 12 beyond which is an annular recess 13 bounded by the inturned flange or rib 20. The other member 14 has an internally screw threaded seat 15 into which is screwed the projecting tube 16. This tube 16 has a shoulder 17 at its base which rests tightly against a gasket 18 and thus makes a tight joint. The tube 16 carries a band of packing 19 at its free end which fits tightly within the cylindrical seat 12.

The member 14 carries four leaf springs 21 with outwardly turned hooked free ends 22. The member 14 has four radially extending slots in which the base ends 31 of the leaf springs 21 are secured. At its extremity the member 14 is reduced in diameter in the part designated 23. This shell 23 of reduced thickness has four slots 24, the portions of the shell between the slots being designated 25 on the drawings. Around the shell 23 is a ring 27 knurled on its exterior surface. The extreme edge 26 of the shell 23 is screw threaded and carries a correspondingly screw threaded ring 28 which provides an annular seat for the knurled ring 27.

The knurled ring 27 carries four inwardly projecting beveled studs or cams 29. The interior cylindrical surface of the member 14 has longitudinally extending channels 30 to receive the respective leaf springs 21. The cams 29 are adapted to push the leaf springs 21 out of their respective channels 30 toward the axis of the hose coupling.

In manufacturing the device the butt ends 31 of the leaf springs 21 are put in place before the tube 16 is screwed into the seat 15. When it is in place it holds the leaf springs in proper position.

To disconnect the members the knurled ring 27 is rotated from the position shown in Fig. 4 to that shown in Fig. 5. This causes the cams 29 to push the leaf springs 16 inwardly and disengage their hooked ends 22 from the inturned flange 20, whereupon the members 11 and 14 may be drawn directly apart without any rotation of either.

Before assembling the parts the ring 27 should be turned to the position shown in Fig. 4. Then when the members 11 and 14 are thrust together the packing 19 will make a tight joint and the beveled faces of the hooks 22 will cause them to automatically enter the recess 13 when they will engage the flange 20.

It will be observed that the members may be assembled at any relative angular position, that is, it is merely necessary to bring them into alinement and push them together. No rotation whatever is necessary in assembling them, but at any angle of rotation they can be assembled equally well. While the ring 27 requires a slight rotation to unlock the members it will be seen that this ring 27 is not an extensive element and its rotation can be very easily effected without necessitating any rotation of the member of the hose coupling themselves.

I claim:—

1. In a device of the class described, two tubular members to be coupled together, one member having a cylindrical interior seat, the other member having a small tubular extension with a packing band around its end adapted to engage said seat, leaf springs carried by the member with the tubular extension and positioned around the same, said leaf springs having outwardly turned hooks, an in-turned flange on the other member adapted to be engaged by said hooks, a rotatable ring on one of the members, and inwardly projecting beveled studs carried by the ring and adapted to engage the said leaf springs.

2. In a device of the class described, two tubular members to be coupled together, the opposed parts of said members being enlarged and one of them having a smaller concentric tubular projection adapted to enter the other and make a tight joint therewith, leaf springs carried within one of said members and projecting therefrom and adapted to enter the other member, said leaf springs having hooks on their ends, a flange on the other member adapted to be engaged by said hooks, a rotatable ring on one of the members, and inward projections with beveled ends carried by the ring and adapted to engage the said leaf springs.

3. In a device of the class described, the member 11 with the seat 12, the member 14 with the tubular extension 16 engaging the seat 12, the spring hooks 21 carried by the member 14, the flange 20 carried by the member 11, and the unlocking ring 27.

4. In a device of the class described, two tubular members adapted to be coupled together with a tight fit, said members being enlarged around the fitting parts so as to form an annular chamber, spring hooks within said annular chamber carried by one member and projecting into the other member, a flange on the other member engaged by the ends of said hooks, and a ring carrying cams to positively disengage said hooks.

In testimony whereof, I have subscribed my name.

SAMUEL STORM.

Witnesses:
R. B. ROWE,
DAVID C. GASSAWAY.